(12) United States Patent
Hikita (10) Patent No.: US 7,627,209 B2
(45) Date of Patent: Dec. 1, 2009

(54) OPTICAL WAVEGUIDE FOR TOUCH PANEL

(75) Inventor: Takami Hikita, Osaka (JP)

(73) Assignee: Nitto Denko Corporation, Ibaraki-Shi (JP)

( * ) Notice: Subject to any disclaimer, the term of this patent is extended or adjusted under 35 U.S.C. 154(b) by 0 days.

(21) Appl. No.: 11/971,530

(22) Filed: Jan. 9, 2008

(65) Prior Publication Data

US 2008/0166096 A1    Jul. 10, 2008

Related U.S. Application Data

(60) Provisional application No. 60/951,012, filed on Jul. 20, 2007.

(30) Foreign Application Priority Data

Jan. 9, 2007    (JP)    ............... 2007-001307

(51) Int. Cl.
  *G06F 3/042*    (2006.01)
  *G02B 6/26*    (2006.01)
  *G02B 6/42*    (2006.01)
  *G02B 6/02*    (2006.01)

(52) U.S. Cl. ............. 385/32; 385/126; 345/176

(58) Field of Classification Search ........ 385/32, 385/126, 129–132; 345/173, 175, 176
See application file for complete search history.

(56) References Cited

U.S. PATENT DOCUMENTS

| | | | |
|---|---|---|---|
| 7,412,119 B2* | 8/2008 | Smits | 385/14 |
| 7,471,865 B2* | 12/2008 | Graham | 385/132 |
| 2006/0001655 A1 | 1/2006 | Tanabe | |
| 2008/0074402 A1* | 3/2008 | Cornish et al. | 345/176 |

* cited by examiner

*Primary Examiner*—Daniel Petkovsek
(74) *Attorney, Agent, or Firm*—Westerman, Hattori, Daniels & Adrian, LLP.

(57) ABSTRACT

An optical waveguide for a touch panel which is arranged for prevention of breakage of bending portions thereof and reduction in light loss. The optical waveguide for a touch panel is configured in a band shape so as to be wrapped around a periphery of a display of the touch panel with a bending portion thereof being positioned at a corner of the periphery of the display, and comprises a core, an under-cladding layer and an over-cladding layer which cooperatively enclose the core, and a reinforcement layer provided at least on a surface portion of the under-cladding layer present on an outer side of the bending portion, wherein the over-cladding layer is absent on an inner side of the bending portion.

18 Claims, 9 Drawing Sheets

OPTICAL WAVEGUIDE FOR TOUCH PANEL

RELATED APPLICATIONS

This application claims the benefit of U.S. Provisional Application No. 60/951,012, filed Jul. 20, 2007, which is hereby incorporated by reference.

BACKGROUND OF THE INVENTION

1. Field of the Invention

The present invention relates to an optical waveguide for a touch panel.

2. Description of the Related Art

Touch panels are input devices for operating an apparatus by directly touching a display screen of a liquid crystal display device or the like by a finger, a special stylus or the like, and include a display which displays operation items, and detection means which detects the position (coordinates) of a portion of the display screen of the display touched by the finger or the like. Information of the touch position detected by the detection means is sent in the form of a signal to the apparatus, which in turn performs an operation specified by the touch position. Examples of the apparatus employing such a touch panel include ATMs in banking facilities, ticket venders in stations and portable game machines.

A detection device employing an optical waveguide is proposed as the detection means for detecting the finger touch position on the touch panel (see, for example, US 2006/0002655A1). The touch panel includes a rectangular frame lens provided on the periphery of the display screen of the rectangular display. A rectangular tubular lens fixture frame integrated coaxially with the frame lens is fitted around the periphery of the display, whereby the frame lens is fixed to the display. The optical waveguide is wrapped around the periphery of the lens fixture frame. The optical waveguide includes a multiplicity of cores through which light passes. With the optical waveguide in the wrapped state, one end face (a light outlet or inlet) of each of the cores is directed toward the frame lens. In each of two pairs of opposed portions of the optical waveguide, light beams emitted from cores in one of the opposed optical waveguide portions are deflected by a portion of the frame lens to travel parallel to the display screen of the display toward an opposed frame lens portion, and further deflected to be incident on cores in the other of the opposed optical waveguide portions by the opposed frame lens portion. The optical waveguide and the frame lens thus arranged cause the light beams to travel in a lattice form on the display screen of the display. When a portion of the display screen of the display is touched by a finger in this state, the finger blocks some of the light beams. Therefore, the position of the portion touched by the finger is detected by detecting a light blocked portion on a light receiving side of the optical waveguide.

However, the optical waveguide of Patent Document 1 is bent to have a smaller curvature radius at corners of the periphery of the rectangular display. Therefore, the optical waveguide is liable to be broken due to a load, and suffer from an increased optical loss.

In view of the foregoing, it is an object of the present invention to provide an optical waveguide for a touch panel which ensures prevention of the breakage of its bending portions and reduction in light loss.

SUMMARY OF THE INVENTION

To achieve the aforementioned object, an inventive optical waveguide for a touch panel is a touch panel optical waveguide which is configured in a band shape so as to be wrapped around a periphery of a display of the touch panel with a bending portion thereof being positioned at a corner of the periphery of the display, and comprises a core, an under-cladding layer and an over-cladding layer which cooperatively enclose the core, and a reinforcement layer provided at least on a surface portion of the under-cladding layer present on an outer side of the bending portion, wherein the over-cladding layer is absent on an inner side of the bending portion.

In the inventive touch panel optical waveguide, the reinforcement layer is provided at least on the surface portion of the under-cladding layer which is present on the outer side of the bending portion of the optical waveguide to be positioned at the corner of the periphery of the display. Therefore, a bending resistance is improved, thereby preventing the breakage. The over-cladding layer is absent on the inner side of the bending portion. Therefore, the core is exposed to air (having a refractive index of 1) on the inner side of the bending portion, so that a difference in refractive index is greater than that between the over-cladding layer and the core. Hence, even if the core is bent, leaking of light passing through the core is suppressed, thereby reducing a light loss. In the absence of the over-cladding layer in the bending portion, the optical waveguide can be easily bent, and the bending portion is less liable to be creased, permitting smooth passage of the light through the core.

In particular, where the reinforcement layer is composed of a metal, the optical waveguide is excellent in bending conformability and in bent shape retention.

DETAILED DESCRIPTION OF THE PREFERRED EMBODIMENTS

Embodiments of the present invention will hereinafter be described in detail with reference to the drawings.

Figure 1A:
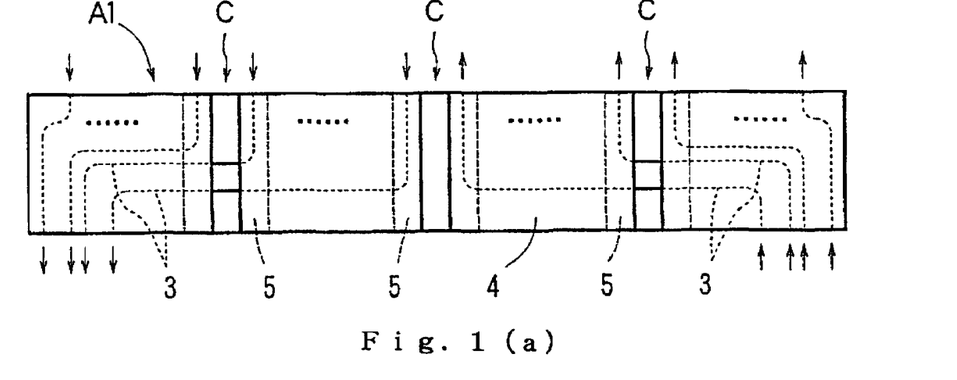
FIGS. 1(a) and 1(b) are a plan view and a sectional view schematically illustrating an optical waveguide according to one embodiment of the present invention.
Figure 1B:
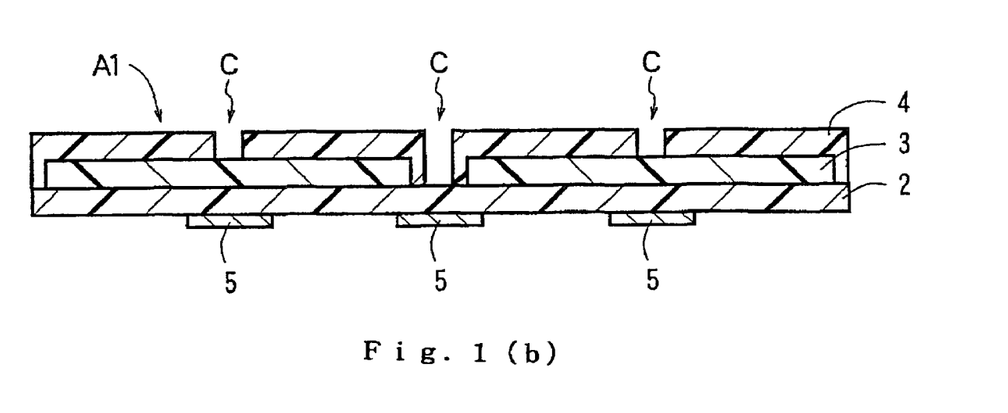
Figure 2:
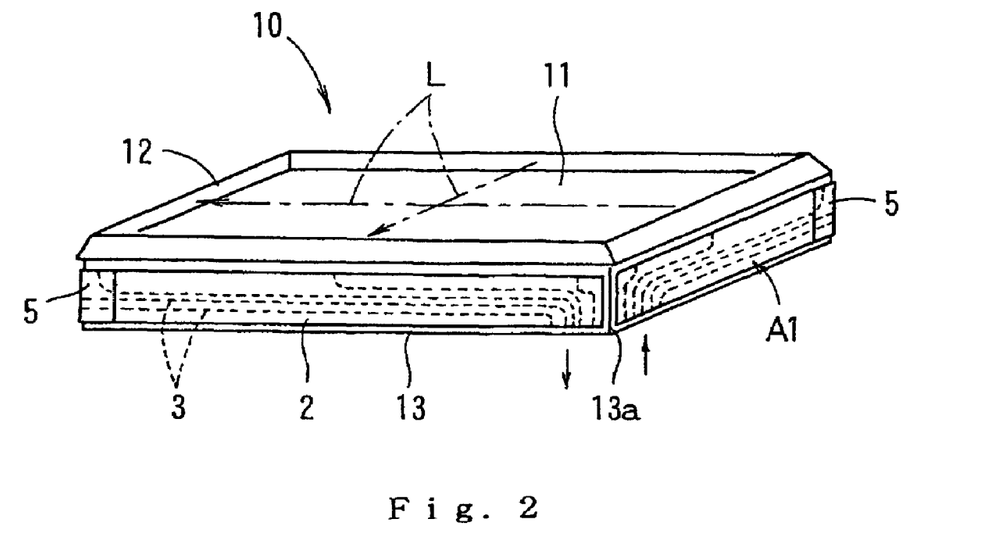
FIG. 2 is a perspective view schematically illustrating a touch panel employing the optical waveguide.

FIGS. 1(a) and 1(b) illustrate an optical waveguide for a touch panel according to one embodiment of the present invention. The touch panel optical waveguide A1 (hereinafter referred to simply as "optical waveguide") according to this embodiment is configured in a band shape such that a plurality of cores 3 are enclosed by an under-cladding layer 2 and an over-cladding layer 4. As shown in FIG. 2, the optical waveguide is wrapped around a periphery of a rectangular display 11 of the touch panel 10 for use. As shown in FIGS. 1(a) and 1(b) the optical waveguide A1 is configured such that reinforcement layers 5 are respectively provided on surface portions of the under-cladding layer 2 which are present on outer sides of bending portions C (three bending portions C in this embodiment) of the optical waveguide A1 to be positioned at corners of the periphery of the display 11 (see FIG. 2), and the over-cladding layer 4 is absent on inner sides of the bending portions C. In FIGS. 1(a) and 2, the cores 3 are indicated by broken lines and solid lines, and the thicknesses of the broken lines and the solid lines correspond to the thicknesses of the cores 3. This is true for the following description.

More specifically, a material for the reinforcement layers 5 is not particularly limited, but is preferably a metal film or a resin film for easy bending in conformity with the corners and for the strength of the reinforcement layers 5, particularly preferably a metal film for an excellent bent shape retaining property. The reinforcement layers 5 preferably each have a thickness in the range of 10 to 30 μm, a length not less than 10 mm (as measured longitudinally of the band-shaped optical waveguide A1), and a width equal to the width of the band-shaped optical waveguide A1. A material for formation of the metal film is not particularly limited, but examples thereof include 42-alloy, stainless steel, copper and aluminum. A material for formation of the resin film is not particularly limited, but examples thereof include polyethylene naphthalates (PEN), polyethylene terephthalates (PET), polyesters, polyacrylates, polycarbonates, polynorbornenes and polyimides.

The bending portions C in which the over-cladding layer 4 is absent preferably each have a width in the range of 3 to 7 mm (as measured longitudinally of the band-shaped optical waveguide A1) for easy bending of the optical waveguide A1. Portions of the cores 3 on which the over-cladding layer 4 is absent are exposed to air, so that a difference in refractive index is greater than that between the cores and the over-cladding layer 4 (in the following example, the cores 3 each have a refractive index of 1.602 and the over-cladding layer 4 has a refractive index of 1.542, while air has a refractive index of 1). Therefore, even if the cores 3 are bent, it is possible to suppress leaking of light passing through the cores 3 and reduce a light loss.

In this embodiment, as shown in FIG. 1(a), the pattern of the cores 3 of the optical waveguide A1 is such that a plurality of cores 3 are equidistantly arranged as extending perpendicularly from one end portion (a left end portion in FIG. 1(a)) of one of opposed side faces (on a lower side in FIG. 1(a)) to the other side face (on an upper side in FIG. 1(a)) in a longitudinally half region (a left half region in FIG. 1(a)) of the band-shaped optical waveguide A1. Further, a plurality of cores 3 are arranged symmetrically with the cores provided in the left half region. That is, the cores 3 are equidistantly arranged as extending perpendicularly from the other end portion (a right end portion in FIG. 1(a)) of the one side face (on the lower side in FIG. 1(a)) to the other side face (on the upper side in FIG. 1(a)) in the other longitudinally half region (a right half region in FIG. 1(a)). In FIG. 1(a), the arrows in the vicinity of the opposite ends of the respective cores 3 indicate light traveling directions. In FIG. 1(a), some of the cores 3 are omitted. In FIG. 1(b), the cores 3 are schematically illustrated. This is true for the subsequent drawings.

As shown in FIG. 2, the touch panel 10 includes a rectangular frame lens 12 provided around the periphery of a display screen of the display 11. A rectangular tubular lens fixture frame 13 integrated coaxially with the frame lens 12 is fitted around the periphery of the display 11, whereby the frame lens 12 is fixed to the display 11. The aforementioned optical waveguide A1 is wrapped around the periphery of the lens fixture frame 13 to be thereby wrapped around the periphery of the display 11. With the optical waveguide being thus wrapped, the side face (the upper side face in FIG. 1(a)) of the optical waveguide in which one-side ends of the cores 3 are equidistantly arranged is positioned adjacent the frame lens 12 (on the upper side in FIG. 2), and the side face (the lower side face in FIG. 1(a)) opposed to the upper side face is positioned adjacent the rear side of the display 11 (on the lower side in FIG. 2). One of the longitudinally opposite edges (the left edge in FIG. 1(a)) and the other edge (the right edge in FIG. 1(a)) of the optical waveguide A1 are positioned at one corner 13a of the periphery of the lens fixture frame 13. At the one corner 13a, ends of the cores 3 located in the other end portion (the right end portion in FIG. 1(a)) of the side face (the lower side face) positioned adjacent the rear side of the display 11 (on the lower side in FIG. 2) are connected to a light source (not shown), and ends of the cores 3 located in the one end portion (the left end portion in FIG. 1(a)) are connected to a detector (not shown). In FIG. 2, the arrows in the vicinity of the one corner 13a of the lens fixture frame 13 and the arrows (one-dot-and-dash lines) on the display 11 indicate the traveling directions of light beams L. In FIG. 2, only some of the light beams are shown.

Figure 3:
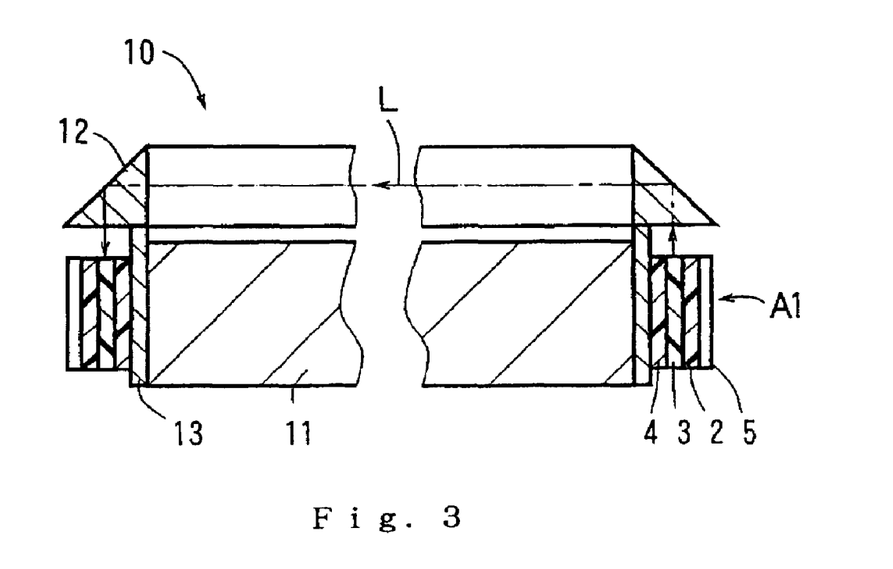
FIG. 3 is a sectional view schematically illustrating the touch panel.

In each of the two pairs of opposed portions of the optical waveguide A1, light beams L each indicated by a one-dot-and-dash line in FIG. 3 are emitted from cores 3 in one of opposed optical waveguide portions toward the frame lens 12, and deflected by the frame lens 12 to travel parallel to the display screen of the display 11 toward an opposed portion of the frame lens 12. Further, the light beams L received by the opposed portion of the frame lens 12 are deflected to be incident on cores in the other optical waveguide portion. Thus, the optical waveguide A1 and the frame lens 12 cause light beams L to travel in a lattice form on the display screen of the display 11 (see FIG. 2). When a portion of the display screen of the display 11 is touched by a finger in this state, the finger blocks some of the light beams L. Therefore, the position of the portion touched by the finger is detected by detecting a light blocked portion on a light receiving side of the optical waveguide A1.

Next, a production method for the optical waveguide A1 will be described by way of examples. Here, a method for producing a plurality of band-shaped optical waveguides A1 arranged in juxtaposed relation with side surfaces thereof adjoining each other (see FIG. 9(a)) will be described.

Figures 4A, 4B:
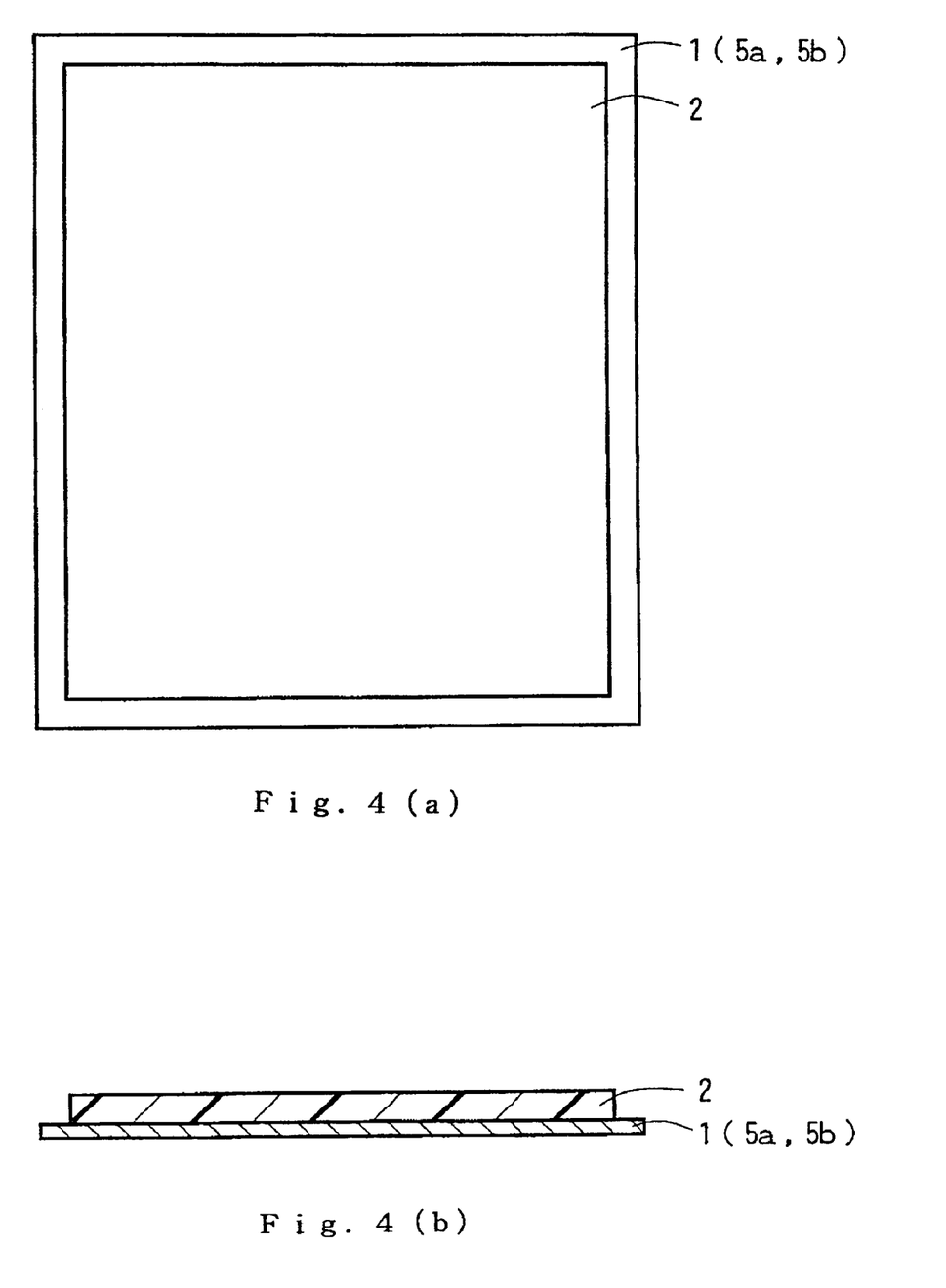
FIGS. 4(a) and 4(b) are a plan view and a sectional view schematically showing a production method for the optical waveguide.

In one example, as shown in FIGS. 4(a) and 4(b), a metal film 5a (having a thickness of 10 to 30 μm) is prepared as a base 1 for the production of the optical waveguides A1 (see FIGS. 1(a) and 1(b)). The metal film 5a partly serves as reinforcement layers 5 as will be described later for the subsequent step of the production method.

In turn, an under-cladding layer 2 is formed on a predetermined region of a surface of the aforementioned metal film 5a. Examples of a material for the formation of the under-cladding layer 2 include polyimide resins, epoxy resins, photopolymerizable resins and photosensitive resins. The method for the formation of the under-cladding layer 2 is not particularly limited, but the formation may be achieved, for example, by applying a varnish prepared by dissolving the aforementioned resin in a solvent onto the base, and then curing the varnish. The application of the varnish is achieved, for example, by a spin coating method, a dipping method, a casting method, an injection method, an ink jet method or the like. The curing is carried out as appropriate depending on the material for the formation of the under-cladding layer 2 and the thickness of the under-cladding layer 2 and the like. Where the under-cladding layer 2 is formed of a polyimide resin, for example, the curing is achieved by a heat treatment at 300° C. to 400° C. for 60 to 180 minutes. Where the under-cladding layer 2 is formed of a photopolymerizable resin, the curing is achieved by irradiation with ultraviolet radiation at 1000 to 5000 mJ/cm$^2$ followed by a heat treatment at 80° C. to 120° C. for 10 to 30 minutes. The thickness of the under-cladding layer 2 is typically 5 to 50 μm for multimode optical waveguides A1, and 1 to 20 μm for single-mode optical waveguides A1.

Figures 5A, 5B:
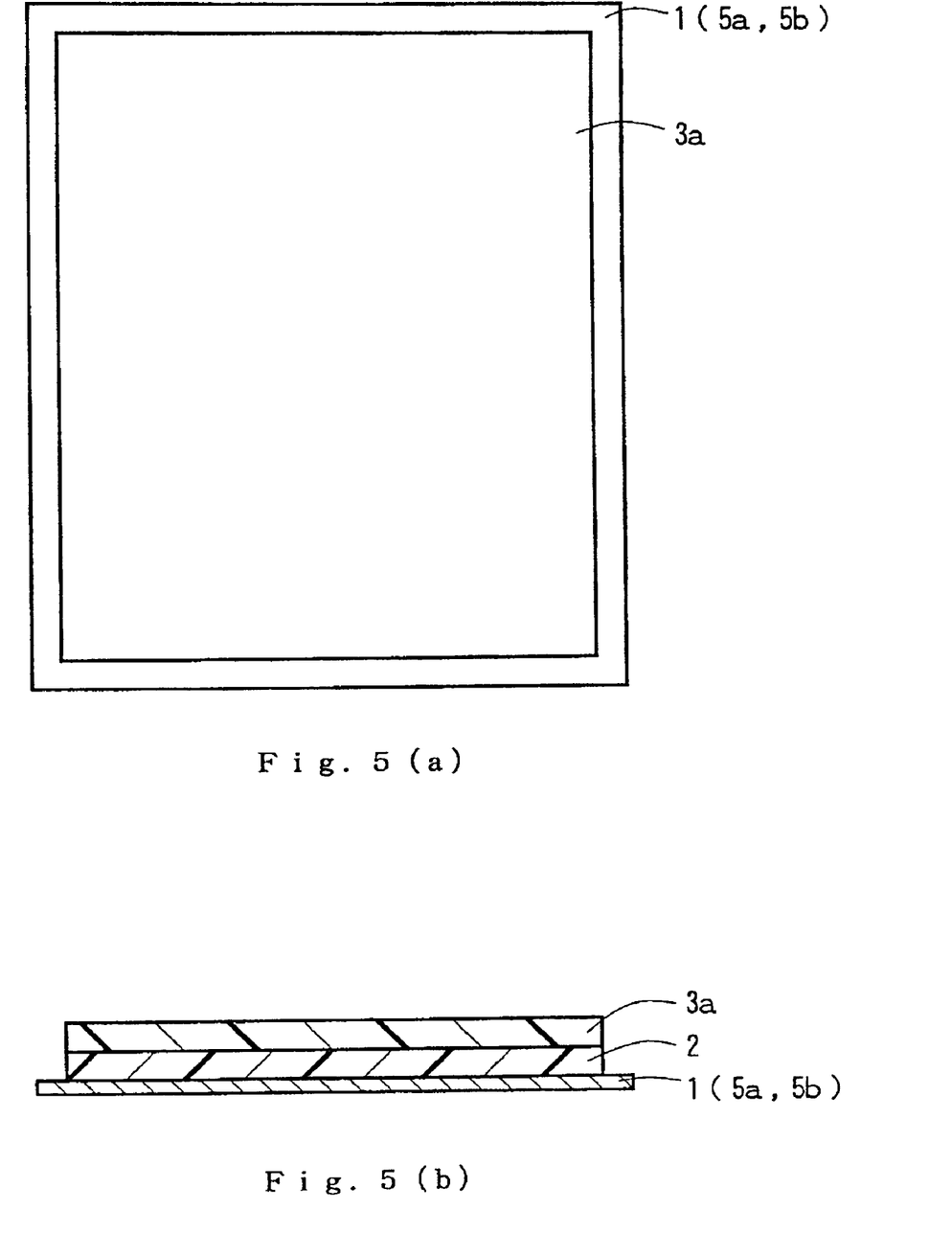
FIGS. 5(a) and 5(b) are a plan view and a sectional view schematically showing a production method for the optical waveguide.

Next, as shown in FIGS. 5(*a*) and 5(*b*), a resin layer 3*a* later serving as cores 3 (see FIGS. 6(*a*) and 6(*b*)) is formed on a surface of the under-cladding layer 2. An exemplary material for the formation of the resin layer 3*a* is a photopolymerizable resin, which is a material having a greater refractive index than the materials for the formation of the aforementioned under-cladding layer 2 and an over-cladding layer 4 to be described later (see FIGS. 8(*a*) and 8(*b*)). The refractive index may be adjusted, for example, by selection of the types of the materials for the formation of the respective layers 2, 3, 4 and adjustment of the composition ratio thereof. The method for the formation of the resin layer 3*a* is not particularly limited, but the formation may be achieved in the same manner as described above, for example, by applying a varnish prepared by dissolving the photopolymerizable resin in a solvent onto the under-cladding layer 2, and then drying the varnish. The application of the varnish is achieved in the same manner as described above, for example, by a spin coating method, a dipping method, a casting method, an injection method, an ink jet method or the like. The drying is achieved by a heat treatment at 50° C. to 120° C. for 10 to 30 minutes.

Figure 6:
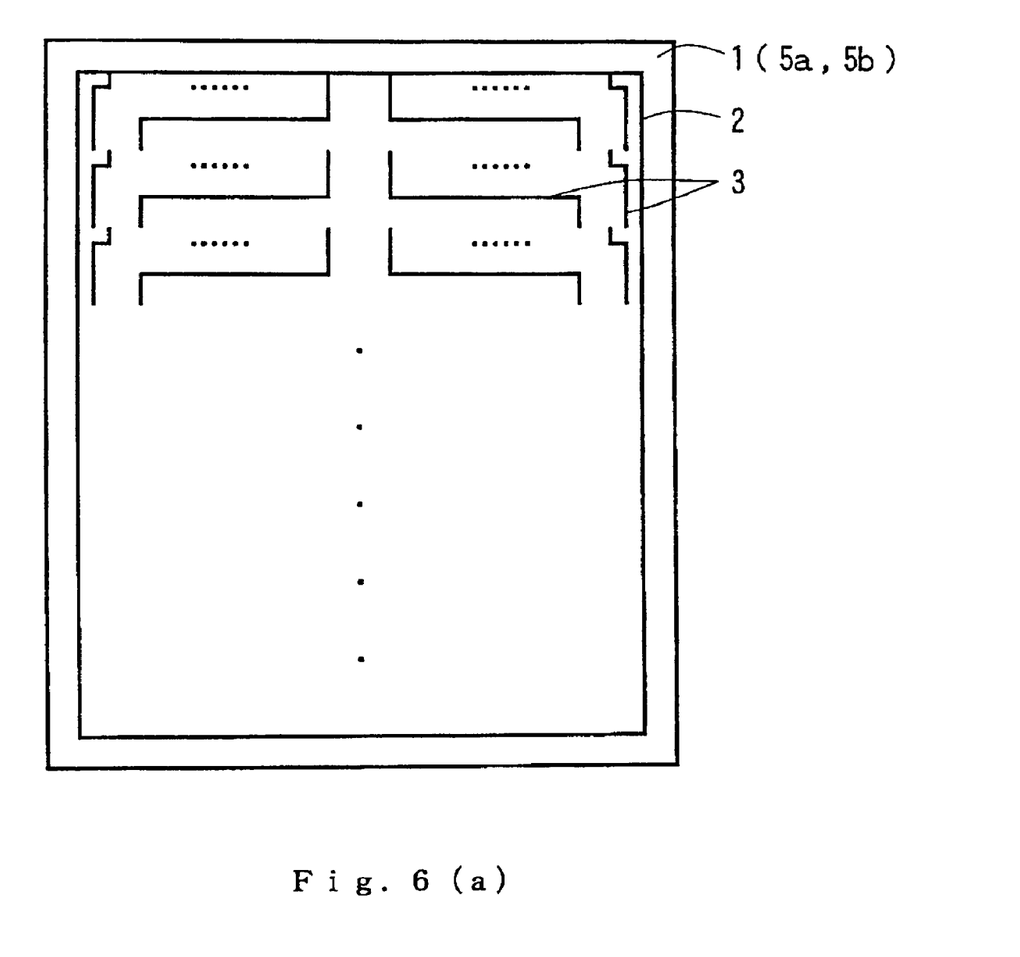
FIGS. 6(a) and 6(b) are a plan view and a sectional view schematically showing a production method for the optical waveguide.

Then, as shown in FIGS. 6(*a*) and 6(*b*), the resin layer 3*a* is formed into desired patterns of cores 3 by photolithography. In this embodiment, the core patterns are respectively formed in regions in which the respective optical waveguides A1 (see FIG. 9(*a*)) are to be formed in juxtaposed relation. That is, the resin layer 3*a* shown in FIGS. 5(*a*) and 5(*b*) is exposed to radiation through a photo mask having opening patterns corresponding to the core patterns. Exemplary methods for the exposure include projection exposure, proximity exposure and contact exposure. Where the resin layer 3*a* is non-adhesive, a contact exposure method is preferably employed in which the photo mask is brought into contact with the resin layer 3*a*. This improves the operating efficiency and permits reliable patterning of a latent image. Examples of the radiation for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 to 10000 mJ/cm$^2$, preferably 50 to 3000 mJ/cm$^2$.

After the exposure, a heat treatment is performed to complete a photoreaction. The heat treatment is performed at 80° C. to 250° C., preferably at 100° C. to 200° C., for 10 seconds to two hours, preferably for five minutes to one hour. Thereafter, a development process is performed by using a developing solution to dissolve away an unexposed portion of the resin layer 3*a*, whereby the resin layer 3*a* is patterned (see FIGS. 6(*a*) and 6(*b*)). Then, the developing solution in the patterned resin layer 3*a* is removed by a heat treatment, whereby the patterns of the cores 3 are formed as shown in FIGS. 6(*a*) and 6(*b*). This heat treatment is typically performed at 80° C. to 120° C. for 10 to 30 minutes. The cores 3 typically each have 20 to 100 μm for the multimode optical waveguides A1, and 2 to 10 μm for the single-mode optical waveguides A1. Exemplary methods to be employed for the development include an immersion method, a spray method and a puddle method. Examples of the developing solution to be used include an organic solvent and an organic solvent containing an alkaline aqueous solution. The developing solution and conditions for the development are properly selected depending on the composition of the photopolymerizable resin.

Figure 7:
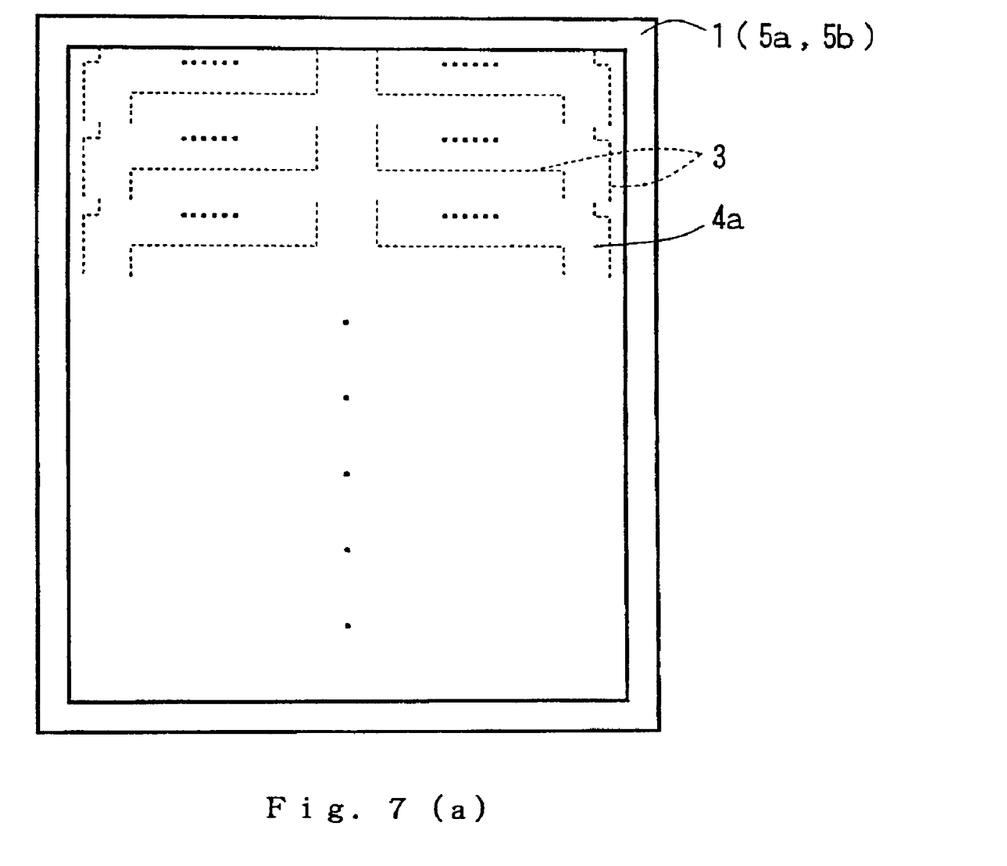
FIGS. 7(a) and 7(b) are a plan view and a sectional view schematically showing a production method for the optical waveguide.
Figures 8A, 8B:
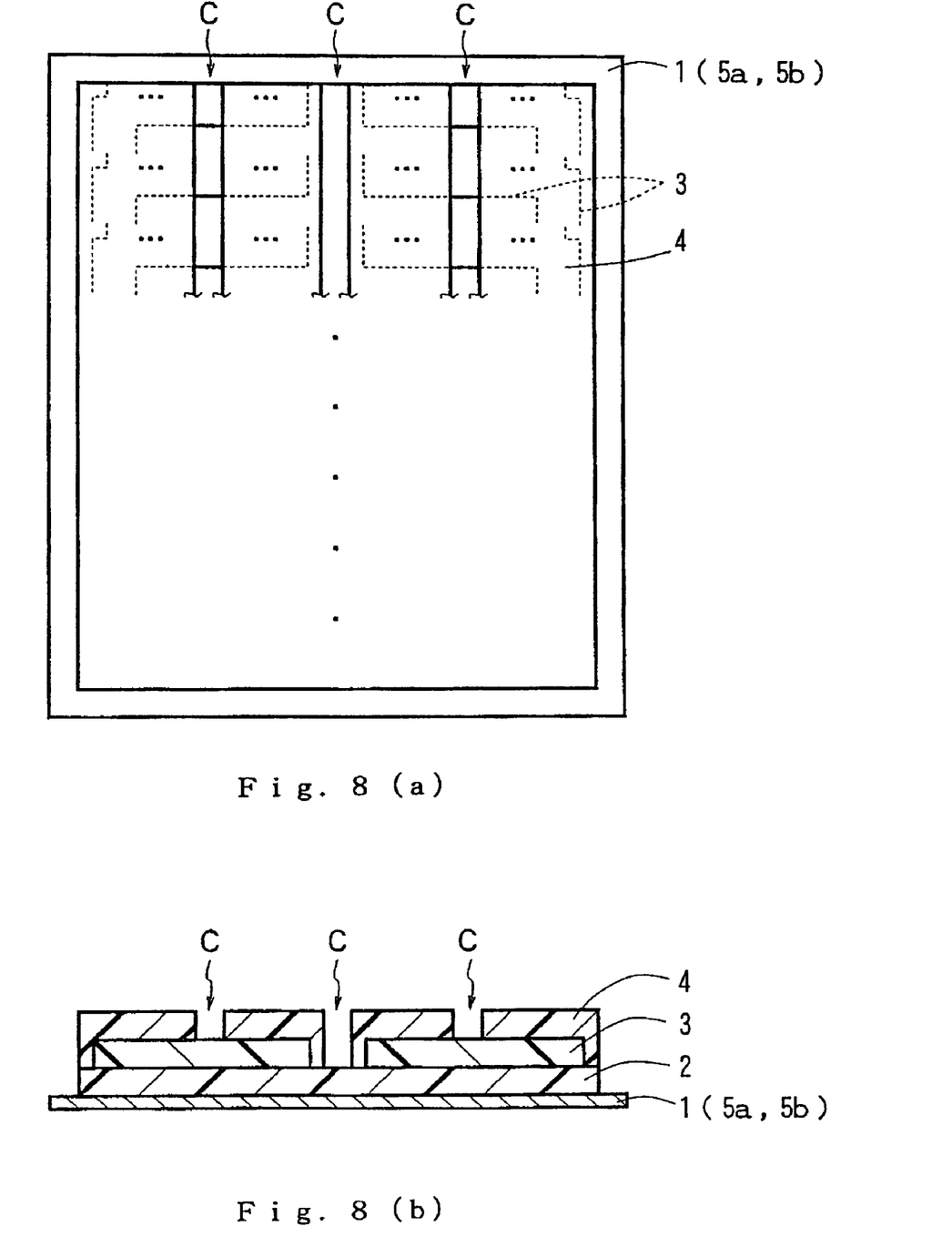
FIGS. 8(a) and 8(b) are a plan view and a sectional view schematically showing a production method for the optical waveguide.

Next, as shown in FIGS. 7(*a*) and 7(*b*), a resin layer 4*a* later serving as the over-cladding layer 4 (see FIGS. 8(*a*) and 8(*b*)) is formed as covering the aforementioned cores 3. An exemplary material for the formation of the rein layer 4*a* is a photopolymerizable resin, which is a material having a smaller refractive index than the material for the formation of the cores 3. The method for the formation of the resin layer 4*a* is not particularly limited, but the formation may be achieved in the same manner as described above, for example, by applying a varnish prepared by dissolving the photopolymerizable resin in a solvent over the cores 3, and then drying the varnish. The application of the varnish is achieved in the same manner as described above, for example, by a spin coating method, a dipping method, a casting method, an injection method, an ink jet method or the like. The drying is achieved by a heat treatment at 50° C. to 120° C. for 10 to 30 minutes.

Then, a photolithography process is performed in substantially the same manner as in the formation of the patterns of the cores 3 so that portions of the resin layer 4*a* present in the bending portions C of the optical waveguides A1 (to be positioned at corners of the lens fixture frame 13 when the optical waveguides A1 are each wrapped around the periphery of the lens fixture frame 13) are unexposed and the other portions of the resin layer 4*a* are exposed. Thus, the over-cladding layer 4 is formed such that the over-cladding layer 4 is absent in the unexposed portions (in the bending portions C of the optical waveguides A1) and present in the other portions as shown in FIGS. 8(*a*) and 8(*b*) The thickness of the over-cladding layer 4 is typically 5 to 100 μm for the multimode optical waveguides A1, and 1 to 20 μm for the single-mode optical waveguides A1.

Figure 9:
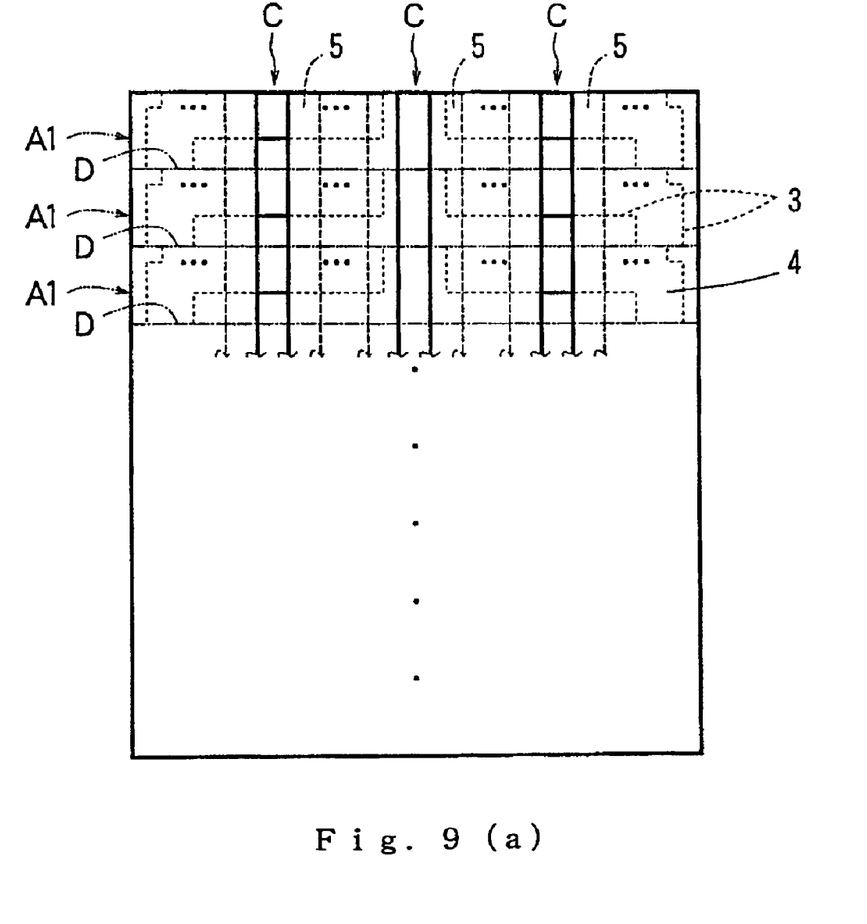
FIGS. 9(a) and 9(b) are a plan view and a sectional view schematically showing a production method for the optical waveguide.

Subsequently, an etching process is performed so that portions of the metal film 5*a* present in the bending portions C of the optical waveguides A1 (formed with no over-cladding layer 4) remain and the other portions of the metal film 5*a* is removed as shown in FIGS. 9(*a*) and 9(*b*). The remaining portions of the metal film 5*a* serve as the reinforcement layers 5. Thus, the plurality of band-shaped optical waveguides A1 are produced in juxtaposed relation with the side surfaces thereof adjoining each other.

Thereafter, the optical waveguides A1 are cut in a band shape (along two-dot-and-dash lines D in FIG. 9(*a*)) by stamping with the use of a cutting die or by dicing (cutting)

with the use of a blade (rotary blade). Thus, the band-shaped optical waveguides A1 each shown in FIGS. 1(a) and 1(b) are provided.

In a second example of the production method for the optical waveguides A1, an under-cladding layer 2, cores 3 and an over-cladding layer 4 are formed on a base 1 as in the first example. Then, the base 1 is removed from the under-cladding layer 2, and reinforcement tapes serving as reinforcement layers 5 are applied onto portions (of the under-cladding layer 2 from which the base is removed) present in the bending portions C of the optical waveguides A1 (formed with no over-cladding layer 4), or strip-shaped films serving as the reinforcement layers 5 are bonded onto the aforementioned portions of the under-cladding layer 2 with an adhesive. Thereafter, the optical waveguides A1 are cut in a band shape by stamping with the use of a cutting die or the like as in the first example. In the second example of the production method, the base 1 is subjected to neither the etching nor the cutting. Therefore, a material for the formation of the base 1 is not particularly limited, but examples thereof include resins, glass, silicon and metals. Examples of the resins include polyethylene naphthalates, polyesters, polyacrylates, polycarbonates, polynorbornenes and polyimides. The thickness of the base 1 is not particularly limited, but is typically in the range of 20 µm (for a film-like base 1) to 5 mm (for a plate-like base 1).

Figure 10:
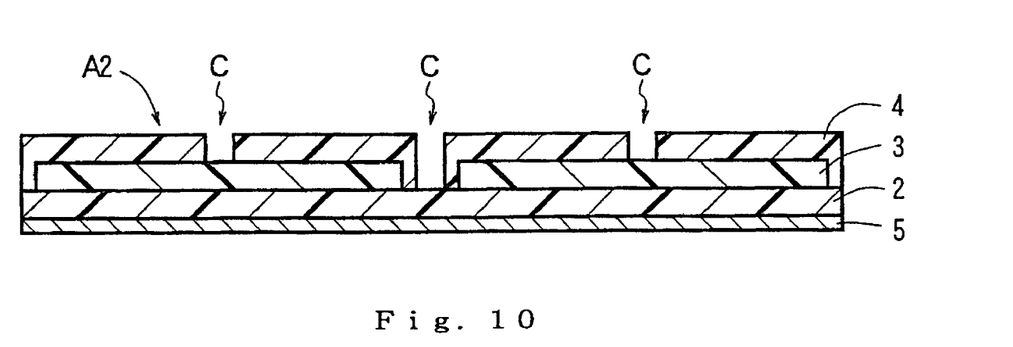
FIG. 10 is a sectional view schematically illustrating an optical waveguide according to another embodiment of the present invention.

FIG. 10 illustrates an optical waveguide according to another embodiment of the present invention. The optical waveguide A2 according to this embodiment is configured in substantially the same manner as the optical waveguide A1 according to the embodiment described above (see FIGS. 1(a) and 1(b)), except that a reinforcement layer 5 is provided over the entire surface of the under-cladding layer 2, i.e., the reinforcement layer 5 covers not only the bending portions C of the optical waveguide A2 (to be positioned at the corners of the lens fixture frame 13 when the optical waveguide A2 is wrapped around the periphery of the lens fixture frame 13) but also the other portions of the optical waveguide A2. Therefore, like components will be denoted by like reference characters.

In a production method for this optical waveguide A2, a metal film 5a or a resin film 5b (see FIGS. 4(a) and 4(b)) later serving as the reinforcement layer 5 is used as a base 1 for production of optical waveguides A2, and an under-cladding layer 2, cores 3 and an over-cladding layer 2 are formed on the base 1 (see FIGS. 8(a) and 8(b)) as in the first example of the aforementioned embodiment. Then, an etching process is performed so that a portion of the base 1 associated with the under-cladding layer 2 entirely remains. Thereafter, the optical waveguides A2 are cut in a band shape by stamping with the use of a cutting die. The production is thus achieved. Alternatively, the production may be achieved, as in the second example of the aforementioned embodiment, by forming an under-cladding layer 2, cores 3, an over-cladding layer 4 on a base 1 (see FIGS. 8(a) and 8(b)), removing the base 1 from the under-cladding layer 2, bonding a film later serving as a reinforcement layer 5 onto the entire under-cladding layer 2 from which the base 1 is removed with an adhesive, and cutting the optical waveguides A2 in a band shape by stamping with the use of a cutting die.

In the embodiments described above, the optical waveguides A1, A2 are each wrapped around the periphery of the display 11 by wrapping the optical waveguide around the periphery of the lens fixture frame 13 and fitting the lens fixture frame 13 around the periphery of the display 11. However, the wrapping method is not limited to the aforementioned method. For example, the optical waveguides A1, A2 may be each wrapped directly around the periphery of the display 11.

Next, an example of the invention will be described in conjunction with a comparative example. It should be noted that the present invention is not limited to the inventive example.

EXAMPLE 1

Material for Formation of Under-Cladding Layer and Over-Cladding Layer

A material for formation of an under-cladding layer and an over-cladding layer was prepared by mixing 35 parts by weight of bisphenoxyethanolfluorene glycidyl ether (component A) represented by the following general formula (1) 40 parts by weight of 3,4-epoxycyclohexenyl methyl 3',4'-epoxyhexenecarboxylate (an alicyclic epoxy CELLOXIDE 2021P manufactured by Daicel Chemical Industries, Ltd.) (component B), 25 parts by weight of an alicyclic epoxy resin having a cyclohexene oxide skeleton (CELLOXTDE 2081 manufactured by Daicel Chemical Industries, Ltd.) (component C), and 2 parts by weight of a 50% propione carbonate solution of 4,4'-bis[di(β-hydroxyethoxy)phenylsulfinio]phenylsulfide bishexafluoroantimonate (component D).

(1)

wherein R1 to R6 are hydrogen atoms, and n=1.

Material for Formation of Cores

A material for formation of cores was prepared by dissolving 70 parts by weight of the aforementioned component A, 30 parts by weight of 1,3,3-tris{4-[2-(3-oxetanyl)]butoxyphenyl}butane and one part by weight of the aforementioned component D in ethyl lactate.

Production of Optical Waveguide

The material for the formation of the under-cladding layer was applied onto a surface of a stainless steel film (250 mm×250 mm×20 μm (thickness)) by a spin coating method, and then exposed to ultraviolet radiation at 2000 mJ/cm$^2$ through a photo mask formed with a desired opening pattern. Subsequently, a heat treatment was performed at 100° C. for 15 minutes to form a square under-cladding layer (230 mm×230 mm). The under-cladding layer had a thickness of 35 μm as measured by a contact film thickness meter. Further, the under-cladding layer had a refractive index of 1.542 at a wavelength of 830 nm.

Then, the material for the formation of the cores was applied onto a surface of the under-cladding layer by a spin coating method, and dried at 100° C. for 5 minutes. In turn, a synthetic quartz chromium mask (photo mask) formed with a desired opening pattern was placed on the resulting core material film, and the core material film was exposed to ultraviolet radiation emitted from above at 4000 mJ/cm$^2$ through the mask by a proximity exposure method. Further, a heat treatment was performed at 120° C. for 15 minutes. Subsequently, a development process was performed by using a γ-butyrolactone aqueous solution to dissolve away unexposed portions, and then a heat treatment was performed at 120° C. for 30 minutes, whereby cores serving as optical waveguide elements were formed. The cores each had a sectional area having a size of 12 μm (width)×24 μm (height)) as measured by SEM. The cores each had a refractive index of 1.602 at a wavelength of 830 nm.

Then, the material for the formation of the over-cladding layer was applied by a spin coating method to cover the cores, and then exposed to ultraviolet radiation at 2000 mJ/cm$^2$ through a photo mask formed with a desired opening pattern. In turn, a heat treatment was performed at 150° C. for 60 minutes. Subsequently, a development process was performed by using a γ-butyrolactone aqueous solution to dissolve away unexposed portions, and then a heat treatment was performed at 120° C. for 30 minutes, whereby the over-cladding layer was formed. Here, the unexposed portions (formed with no over-cladding layer) each had a width of 5 mm. The over-cladding layer had a thickness of 35 μm as measured by the contact film thickness meter. Further, the over-cladding layer had a refractive index of 1.542 at a wavelength of 830 nm.

Thereafter, an acryl-based dry film resist was laminated on a surface of the stainless steel film at 110° C. and, in this state, was exposed to ultraviolet radiation at 80 mJ/cm$^2$ through a photo mask formed with a desired opening pattern. Then, a development process was performed so that portions of the stainless steel film other than those to be left as reinforcement layers were exposed from the resist. Subsequently, the exposed portions of the stainless steel film were etched away with the use of a ferric chloride aqueous solution. In turn, the resist remaining on the resulting reinforcement layers was removed by using an organic solvent (NMP). Then, optical waveguides were cut in a band shape by a cutting die (Thompson blade with a surface-polished edge provided at an edge angle of 30 degrees) to provide band-shaped optical waveguides.

The optical waveguides thus provided each had a length of 230 mm and a width of 10 mm. The portions formed with no over-cladding layer each had a width of 5 mm, and the reinforcement layers each had a length of 20 mm and a width of 10 mm.

COMPARATIVE EXAMPLE 1

Comparative Example 1 was configured in substantially the same manner as in Example 1, except that no reinforcement layer was formed and the portions formed with no over-cladding layer were absent (the over-cladding layer was formed over the entire surface).

Evaluation of Light Confining Capability

The optical waveguides of Example 1 and Comparative Example 1 were each bent at 90 degrees with a curvature radius of 2 mm, and examined for insertion light loss. At this time, a portion of the optical waveguide of Example 1 formed with no over-cladding layer was bent inward. As a result, no change was observed in insertion loss when the optical waveguide of Example 1 was bent. On the contrary, an increase in insertion loss was observed when the optical waveguide of Comparative Example 1 was bent.

Tight Fixability of Optical Waveguide

The optical waveguides of Example 1 and Comparative Example 1 were each wrapped around the rectangular tubular lens fixture frame. As a result, the optical waveguide of Example 1 was intimately fitted on the lens fixture frame even at a corner of the frame. However, the optical waveguide of Comparative Example 1 was not intimately fitted at the corner.

What is claimed is:

1. A touch panel optical waveguide wrapped around a periphery of a display of a touch panel and having a bending portion positioned at a corner of the periphery of the display, the optical waveguide further comprising:
a core;
an under-cladding layer and an over-cladding layer which cooperatively enclose the core; and
a reinforcement layer provided at least on a surface portion of the under-cladding layer present on an outer side of the bending portion,
wherein the over-cladding layer is absent on an inner side of the bending portion.

2. The touch panel optical waveguide as set forth in claim 1, wherein the reinforcement layer is composed of a metal fitted at the corner.

3. The touch panel optical waveguide as set forth in claim 2, wherein the metal is selected from the group consisting of 42-alloy, stainless steel, copper and aluminum.

4. The touch panel optical waveguide as set forth in claim 1, wherein the reinforcement layer has a thickness in the range of 10 to 30 μm, a length not less than 10 mm, and a width equal to the width of the optical waveguide.

5. The touch panel optical waveguide as set forth in claim 1, wherein the reinforcement layer is composed of a resin film.

6. The touch panel optical waveguide as set forth in claim 5, wherein the resin film is selected from the group consisting of polyethylene naphthalate (PEN), polyethylene terephthalate (PET), polyester, polyacrylate, polycarbonate, polynorbornene and polyimide.

7. The touch panel optical waveguide as set forth in claim 1, wherein the reinforcement layer is provided over the entire surface of the under-cladding layer.

8. The touch panel optical waveguide as set forth in claim 1, wherein the reinforcement layer is provided only at locations corresponding to said bending portions.

9. The touch panel optical waveguide as set forth in claim 1, wherein width of the bending portion in which the over-cladding layer is absent is in the range of 3 to 7 mm.

10. The touch panel optical waveguide as set forth in claim 1, wherein the difference between the refractive index of the core and air (having a refractive index of 1) is greater than a difference in refractive index between the over-cladding layer and the core.

11. The touch panel optical waveguide as set forth in claim 1, wherein the under-cladding layer is selected from the group consisting of polyimide resin, epoxy resin, photopolymerizable resin and photosensitive resin.

12. The touch panel optical waveguide as set forth in claim 1, comprising a plurality of bending portions and a plurality of cores.

13. The touch panel optical waveguide as set forth in claim 12, wherein said plurality of cores are arranged equidistant from each other.

14. The touch panel optical waveguide as set forth in claim 13, wherein said plurality of cores are symmetrically arranged on said optical waveguide.

15. A touch panel comprising:
a display comprising corners; and
the optical waveguide of claim 12 wrapped around a periphery of the display,
wherein bending portions of the optical waveguide are located at the corners.

16. The touch panel of claim 15,
wherein the display comprises a display screen,
the touch panel comprises a frame lens and a tubular lens fixture frame integrated coaxially with the frame lens provided on the periphery of the display screen whereby the frame lens is fixed to the display, and
the optical waveguide is wrapped around a periphery of the lens fixture frame.

17. A touch panel comprising:
a display comprising a corner; and
the optical waveguide of claim 1 wrapped around a periphery of the display,
wherein the bending portion of the optical waveguide is located at the corner.

18. The touch panel of claim 17,
wherein the display comprises a display screen,
the touch panel comprises a frame lens and a tubular lens fixture frame integrated coaxially with the frame lens provided on the periphery of the display screen whereby the frame lens is fixed to the display, and
the optical waveguide is wrapped around a periphery of the lens fixture frame.

* * * * *